Oct. 16, 1923.
C. B. LONG
DRILL CHUCK
Filed May 28, 1921
1,471,271
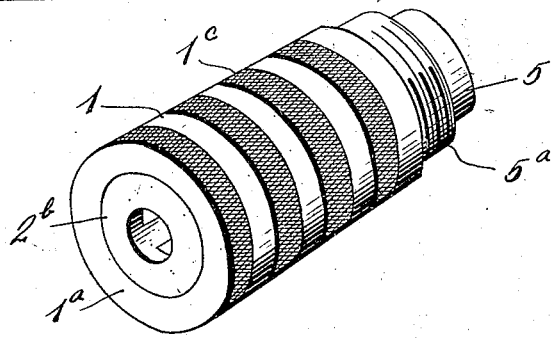
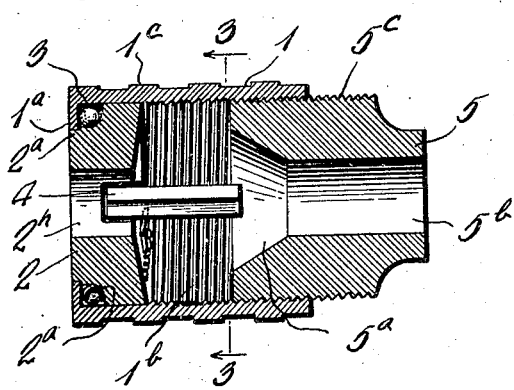
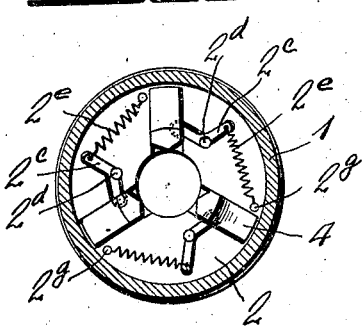
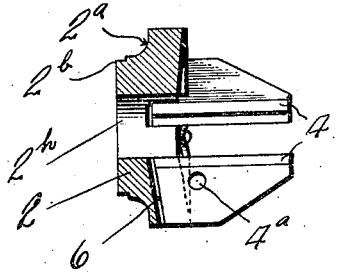
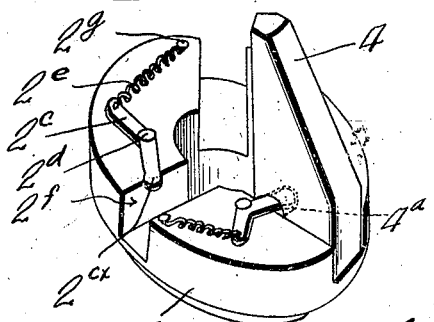
Inventor
Charles B. Long
By Julius C. Dowell
his Attorney Patented Oct. 16, 1923.

1,471,271

UNITED STATES PATENT OFFICE.

CHARLES BOMBERGER LONG, OF LANCASTER, PENNSYLVANIA, ASSIGNOR TO CHAMPION BLOWER & FORGE COMPANY, OF LANCASTER, PENNSYLVANIA, A CORPORATION OF PENNSYLVANIA.

DRILL CHUCK.

Application filed May 28, 1921. Serial No. 473,476.

*To all whom it may concern:*

Be it known that I, CHARLES B. LONG, a citizen of the United States, residing at Lancaster, in the county of Lancaster and State of Pennsylvania, have invented certain new and useful Improvements in Drill Chucks; and I do hereby declare the following to be a full, clear, and exact description of the invention, such as will enable others skilled in the art to which it appertains to make and use the same.

My invention relates to what are commonly known as drill chucks, and more particularly to a chuck adapted to firmly grip and hold the shank of a drill or other tool during the operation of drilling or the like.

The objects of my invention are to provide an improved drill chuck of substantial construction adapted to be easily manipulated for gripping or releasing a tool, and consisting of few simple and inexpensive parts so constructed and arranged that they may be readily removed and replaced by an unskilled mechanic, when in need of repair or for other cause, and which is not liable to get out of order or to be easily broken.

The invention will first be hereinafter more particularly described, with reference to the accompanying drawings, which are to be taken as a part of this specification, and then pointed out in the claims at the end of the description.

In said drawings,

Fig. 1 is a perspective view of a chuck embodying my invention;

Fig. 2 is a longitudinal sectional view of the same;

Fig. 3 is a transverse section taken on the line 3—3 of Fig. 2;

Fig. 4 is a longitudinal sectional view of the jaw-carrying member showing two of the jaws in normal position; and Fig. 5 is a detail fragmentary view illustrating the method of mounting the jaws.

Referring to said drawings, in which the same reference characters are used to denote corresponding parts in different views, 1 denotes a cylindrical body or sleeve having an inwardly projecting annular flange $1^a$, and internally threaded as at $1^b$, to receive a tightening nut 5 having an axial bore $5^b$. A series of spaced annular knurled portions $1^c$ may be provided on the outer surface of the cylindrical body to facilitate turning the same when gripped by the hand of the operator. Within the cylindrical body or sleeve 1, is placed a jaw-carrying head or member 2, preferably of cylindrical form and having a central bore $2^h$ for the insertion of a drill or other tool. The member 2 is formed with an annular concavity or ball-race $2^a$ and a reduced extension $2^b$, which fits snugly within the annular flange $1^a$ on the sleeve 1, whereby it is centered in said sleeve with its outer end substantially flush with the outer surface of said flange. An annular ball retainer and separator of ordinary construction from which the balls project in a well known manner in three directions is placed in the ball-race $2^a$, so that the balls may contact with the inner surface of the sleeve 1 and with the flange $1^a$, so as to reduce friction to a minimum when the jaw-carrying head is caused to rotate with the tightening nut, when said nut is turned in sliding contact with the gripping jaws in securing a firm hold on the drill or other tool, and when turned in a reverse direction to release the hold of the jaws on the tool. The member 2 is formed or provided with three, more or less, radial slots $2^f$, which are preferably equidistantly spaced and in said slots are fitted an equal number of jaws 4, which are rockingly mounted on the member 2 by means of angular levers $2^c$ fulcrumed at the angle or bend therein on the member 2 as at $2^d$ and having one arm $2^{cx}$ arranged to project into a socket $4^a$ in one side of the jaw, while the other arm thereof is secured to one end of a spring $2^e$ the other end of which is attached to the member 2 by means of a set screw or pin $2^g$, so that said springs tend normally to force the jaws radially outwardly and to yieldingly resist inward movement thereof. The outer surfaces of the jaws 4 are beveled or inclined inwardly from an intermediate point to their rear ends while their forward ends 6 are reversely inclined at an obtuse angle to the axis of the head 2, and the bottoms of the slots $2^f$ are correspondingly inclined so that the tendency of the jaws when resting upon said inclined bottoms in a vertical position is to move inwardly in opposition to the pressure exerted by the springs $2^e$, through the levers $2^c$, and when the tightening nut is screwed inwardly so as to contact with the inclined surfaces of said jaws they will be caused to move inwardly into contact with the tool their entire length and to firmly grip and center the tool in the axial line of the chuck. The jaws 4 have biting edges extending the full length thereof, parallel with the axes of the members 1 and 2, and as their outer edges are inclined or beveled toward the axis of the body so as to provide extended bearing faces in sliding contact with the correspondingly beveled end portions $5^a$ of the tightening nut, while their bases or forward ends are inclined to conform to the inclined bottoms of the slots in the head on which they are mounted, an easy sliding movement of the series of jaws in parallel planes is insured.

My improved chuck may be attached by any suitable means to a lathe mandrel, or the like, and the jaws will be actuated by turning the cylindrical body or sleeve 1, so as to grip or release any object that may be inserted thru the bore $2^b$ between the jaws, and the jaws may be released and removed by simply turning the levers $2^c$ far enough to disengage their rounded inner ends from the sockets in the sides of the jaws.

Having thus described my invention, what I claim as new and desire to secure by Letters Patent of the United States is:

1. In a chuck, a cylindrical body, a revoluble jaw-carrying member within said body carrying radially slidable jaws rockingly mounted thereon for clamping a tool therebetween, each jaw having a socket in one side thereof and supports for said jaws pivoted intermediate their ends to said member so that in assembling or disassembling the chuck one end of the support may swing into and out of engagement with a socket in the adjacent jaw, springs acting on the free ends of said supports tending to force the jaws apart, and a nut screwed into said body and adapted to operate said jaws for clamping a tool therebetween.

2. In a chuck, longitudinally and radially slidable jaws for clamping a tool, said jaws each having a socket in one side thereof and mounted on pivotal supports, said supports comprising elbow-levers pivoted on the jaw-carrying member and having the free end of one arm of each lever movable into and out of engagement with a socket in one of said jaws for pivotally supporting it in operative position and permitting it to be detached, and springs acting on said levers tending to move said jaws apart.

3. A chuck comprising a cylindrical body enclosing a revoluble tool receiving member, said member having sidewise movable jaws mounted on intermediately pivoted supports carried by said member and adapted to swing on their pivots so as to cause one end thereof to move into and out of pivotal engagement with an adjacent jaw, a nut for actuating said jaws, means tending to move the jaws apart, and means to prevent binding contact of said jaw-carrying member when said jaws are caused to grip a tool.

In testimony whereof I affix my signature in the presence of two witnesses.

CHARLES BOMBERGER LONG.

Witnesses:
  GEORGE HAMMOND,
  ARTHUR M. SMITH.